April 9, 1940.  O. ANDERSON  2,196,376
COMBINATION BAIT HOLDER AND FISHHOOK
Filed July 1, 1939
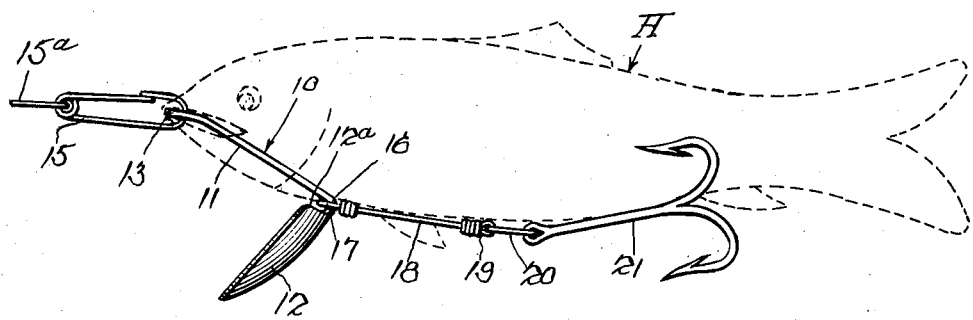
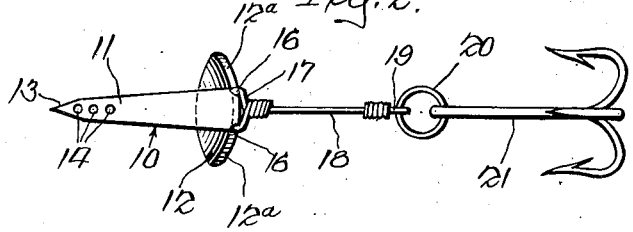
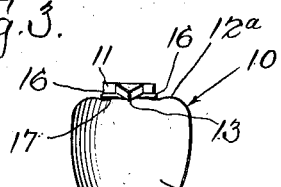
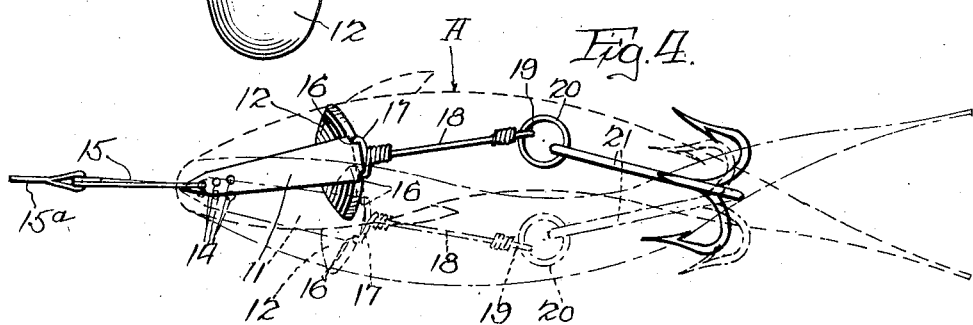
Inventor:
Oscar Anderson.

Patented Apr. 9, 1940

2,196,376

UNITED STATES PATENT OFFICE 2,196,376

COMBINATION BAIT HOLDER AND FISHHOOK

Oscar Anderson, Chicago, Ill.

Application July 1, 1939, Serial No. 282,327

9 Claims. (Cl. 43—40)

This invention relates to fishing tackle, and is more particularly directed to a combination bait holder and fishhook.

One object of my invention is the provision of a bait holder and fishhook of this character, which is simple and inexpensive to manufacture, efficient in its operation, and which is designed to be self-contained, so that it may be easily and securely attached to the bait for causing the bait to produce movements simulating a live fish when drawn through the water.

Various arrangements of devices for holding bait of different kinds have heretofore been proposed. In many of such arrangements, the device is provided with prongs or other means for frictionally holding the bait, and in some devices, an impaling needle has been provided upon which the bait, such as a minnow or other bait, was impaled by inserting the impaling needle rearwardly into the bait and various kinds of securing devices were provided for retaining the bait on the needle. These various devices have generally proven ineffective, since the line is attached to the device and the tendency is to draw the impaling needle out of the bait which is resisted only by the prongs or other devices that hold the bait. Also, while the bait is held on the device, it assumes a fixed position and in order to provide an attractive action, spinners and other devices are employed to agitate the water. However, even with these various holding devices, the bait is often dislodged and lost, due to the impetus given it when casting or trolling, when the bait engages weeds and other obstructions.

The present invention contemplates the provision of an impaling member arranged in such manner that when inserted into the bait, no fastening or holding devices are necessary for retaining the same in position and the loss of bait will be prevented.

In carrying out my invention in one form, I provide a bait holder which preferably consists of an integral piece of relatively thin, stiff metal, shaped and formed to provide an impaling member and a concavo-convex depending portion forming a water resistance plate at the rearward end of the impaling member with the concave surface of the water resistance plate directed toward the free or forward end of the impaling member. When thus formed, the bait holder becomes a rigid member which can be easily held for attaching the bait thereto, and a link which is secured to the bait holder, supports a triple hook which serves with the bait holder to guide and support the bait.

More particularly, the link is adapted to swing vertically on the bait holder while being relatively rigid with respect to its sidewise movement thereon, and any side to side movement of the bait holder effects a like movement of the link. A triple hook is secured by a split ring to the link and this ring permits of the removing of the hook to be replaced by a larger or smaller hook, and the ring also permits of free movement of the hook at the end of the link for inserting it into the bait and for free movement with the bait when inserted.

As a further aspect of my invention, the water resistance plate provides means which may be manually gripped for easily inserting the impaling member into the bait. Thus the impaling member is pointed so as to easily penetrate the bait, such as a minnow or other small fish, a distance rearwardly of its mouth, approximately the length of the impaling member and on the underside of the fish or bait. The impaling member is inserted forwardly through the body and emerges into the mouth of the fish. The line is then attached to any one of a number of apertures provided in the impaling member adjacent the pointed end thereof. The line has the ordinary leader fixed thereto and to attach the line to the bait holder, the leader is inserted through the lower lip of the minnow and through one of the apertures of the impaling member and through the upper lip of the minnow. After the bait holder is in position, one of the hooks of the triple hook is inserted in the minnow rearwardly of the bait holder which retains the hook in proper position to catch a fish when it strikes.

For a more complete understanding of my invention, reference should now be had to the drawing, in which:

Figure 1 is a side view of the fishook and bait holder with a minnow, shown in dotted lines, impaled thereon.

Figure 2 is a top plan view of the fishhook and bait holder.

Figure 3 is a view in front elevation.

Figure 4 is a top plan view illustrating the movement of the bait holder and bait in dotted and dot and dash lines when drawn through the water.

The specific form of bait holder 10 shown in the drawing, is preferably constructed of one piece of metal blanked and formed to provide an impaling member 11 and a concavo-convex depending portion forming a water resistance plate 12. The impaling member 11 is provided with a pointed end 13 for easy penetration of the bait, and adjacent the point 13, the impaling member 11 is provided with a plurality of aligned apertures 14 through which a leader 15 of a line 15a may extend to be attached. The depending portion forming the water resistance plate 12 has its concave surface directed forwardly toward the point 13 of the impaling member 11.

At the juncture of member 11 and portion 12, the bait holder 10 is provided on opposite sides with notches 16—16 in which the looped end 17 of a link 18 is secured, and which link may swing vertically while being relatively rigid with the impaling member 11, with respect to its sidewise movement. The link 18 may be blanked of metal stock, but, as shown, is relatively stiff wire and the loop 17 thereof is drawn tightly in the notches 16—16 of the bait holder 10, and the other end of link 18 is also provided with a loop 19 which receives a split ring 20, and which ring serves to attach the triple hook 21 to the link.

The bait holder 10 is attached to a minnow or other small fish used as bait in the following manner; the depending portion 12 is manually gripped and the impaling member 11 is positioned rearwardly of the mouth of the minnow or fish on its under side approximately the distance of the length of the impaling member, and the point 13 is inserted therein and forced forwardly through the body until the point 13 emerges into the mouth of the minnow. This positioning of the bait holder 10 aligns it longitudinally of the minnow and the link 18 then extends rearwardly under the minnow and may swing vertically by reason of its loop 17. Then one of the hooks of the triple hook 21 at the end of the link is inserted in the bottom of the minnow forwardly of its tail and this inserted hook supports the triple hook 21 aligned with the bait holder.

After the bait is in position as above described, the line 15a is attached to the impaling member 11 by inserting the leader 15 through the lower lip of the minnow and through one of the apertures 14 in the impaling member and through the upper lip of the minnow, and when thus attached, the bait may be used for casting or trolling without fear of its being disarranged or lost.

It will be noted that the line 15a when attached to the bait holder is aligned longitudinally of the bait and is secured to the bait as well as to the bait holder, and the pull exerted on the leader tends to retain the bait holder snugly in position. As the bait is being drawn through the water, the water resistance plate 12 has a retarding action, and as the top edge 12a of the water resistance plate 12 is in close proximity with the bottom of the minnow, the water must pass below and around the water resistance plate which, due to its concave surface, effects a rocking side to side movement of the bait holder. This side to side movement of the bait holder 10 carries the link 18 therewith, which tends to carry the hook 21 therewith, by reason of its connection 20. This connection 20 permits the free end of hook 21 to swing, which effects a horizontal swinging movement of the tail of the minnow, producing a movement simulating a live fish.

As the top edge 12a of the water resistance plate 12 engages the underside of the bait to which the bait holder is attached, it will hold the bait holder in position and prevent its rocking with respect to the bait.

It will also be noted that the water resistance plate 12, the link 18, ring 20 and hook 21 are all below the bait, and the weight thereof retains the bait or minnow in a natural position at all times. As the water resistance plate 12 is a substantial distance rearwardly of the mouth of the minnow, at which point the line is attached in an aperture 14 of the bait holder, this point serves as an imaginary pivotal center from which the bait is caused to move from side to side when the minnow is drawn through the water.

The impaling member 11 is preferably tapered on each side thereof from its rearward end to its penetrating end. This tapering of the impaling member serves to securely imbed the same in the bait, and as the line is secured to the penetrating end, the more the pull, the firmer the impaling member imbeds itself in the bait.

I claim:

1. A bait holder comprising an impaling member for supporting the bait, a water resistance plate extending angularly downwardly at the rearward end of said impaling member, a link pivoted for vertical movement to the bait holder at the juncture of said impaling member and said water resistance plate, a hook carried at the free end of said link for engaging the bait, and a line secured to the forward end of the impaling member.

2. A bait holder comprising a forwardly extending impaling member for supporting the bait, a water resistance plate depending from the rearward end of said member, a link having one end attached to the rearward end of said member for positive movement in a sidewise direction therewith, and a hook carried at the other end of said link for engaging the bait and retaining the bait in secured relation to said member.

3. A bait holder comprising an impaling member for supporting the bait, a link secured at one of its ends for vertical swinging movement on the rearward end of said impaling member, a fishhook, and means securing the fishhook to the other end of said link.

4. A bait holder comprising an impaling member for supporting the bait, line attaching means at the forward end of said member, a water resistance plate depending from the rearward end of said member, a link secured at one of its ends to the rearward end of said member, a fishhook, and means securing the fishhook to the other end of said link.

5. A bait holder comprising an impaling member adapted to penetrate and support the bait, line attaching means at the penetrating end of said impaling member, a depending water resistance plate at the other end of said impaling member, a link carried by the impaling member adjacent said depending water resistance plate, a fishhook, and means securing the fishhook to the free end of said link.

6. A bait holder comprising an integral impaling member and water resistance plate, said impaling member having provision at its penetrating end for attaching the leader of a fishing line and provided with notches at its other end, the notches being oppositely disposed for receiving the loop of a link to be supported therein, the link extending rearwardly of the water resistance plate, and a hook carried at the rearward end of the link.

7. A bait holder comprising an impaling member having its opposite sides tapered toward the penetrating end thereof, a water resistance plate depending from the rearward end of said impaling member, and a link including a detachable hook extending rearwardly of the impaling member.

8. A bait holder comprising a forwardly disposed impaling member supporting the bait, line attaching means at the forward end of said impaling member, a water resistance plate depending from the rearward end of said impaling member, a link carried by the impaling member and extending rearwardly in aligned relation therewith, and a hook detachably carried at the rearward end of said link.

9. A bait holder comprising an impaling member for supporting the bait, line attaching means at the forward end of said member, a water resistance plate depending from said member, a link secured at one end to the rearward end of said member, a fishhook, and means securing the fishhook to the end of said link.

OSCAR ANDERSON.